July 6, 1954

S. T. GROSS 2,683,220

SPECTROGRAPH DEVICE

Filed June 4, 1949

INVENTOR
Siegfried T. Gross
BY Edward J. Willey
ATTORNEYS

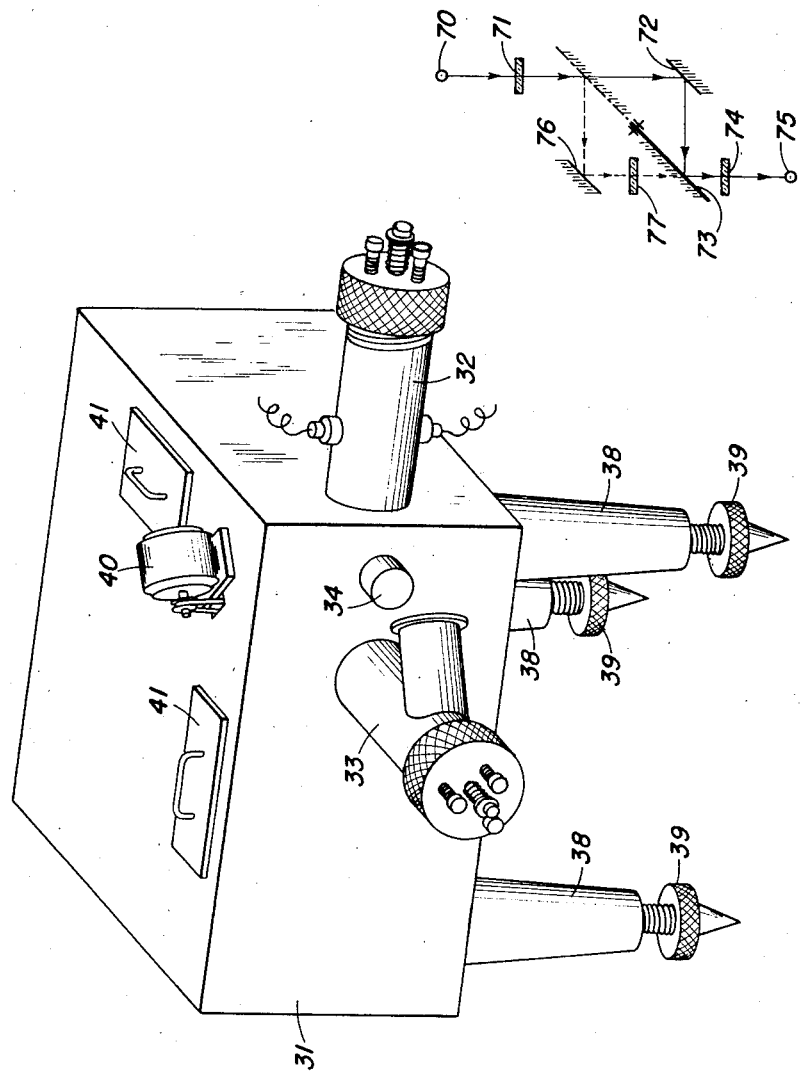

July 6, 1954
S. T. GROSS
2,683,220
SPECTROGRAPH DEVICE
Filed June 4, 1949
5 Sheets-Sheet 3
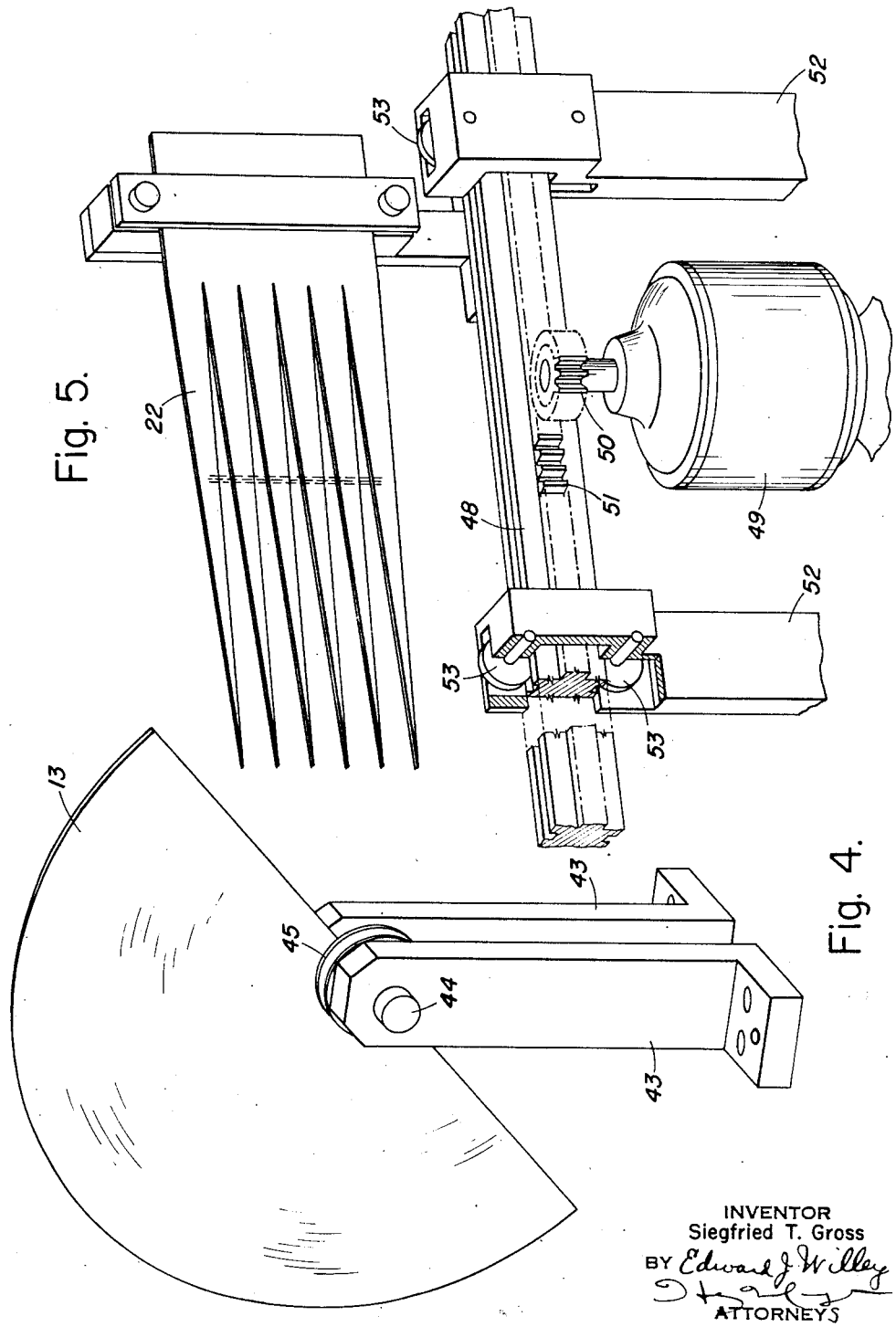
INVENTOR
Siegfried T. Gross
BY Edward J. Willey
ATTORNEYS July 6, 1954  S. T. GROSS  2,683,220
SPECTROGRAPH DEVICE
Filed June 4, 1949  5 Sheets-Sheet 4

INVENTOR
Siegfried T. Gross
BY Edward J. Willey
ATTORNEYS

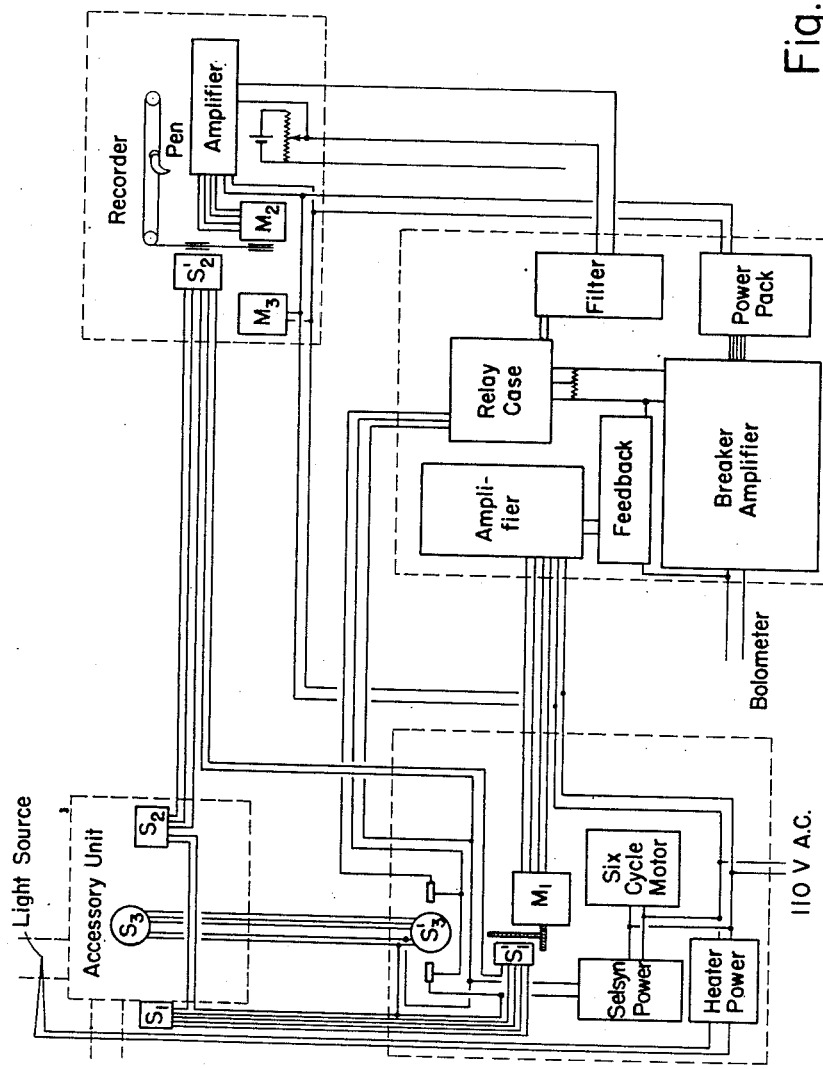

Patented July 6, 1954

2,683,220

UNITED STATES PATENT OFFICE 2,683,220

SPECTROGRAPH DEVICE

Siegfried T. Gross, Easton, Pa., assignor to General Aniline & Film Corporation, New York, N. Y., a corporation of Delaware Application June 4, 1949, Serial No. 97,265

6 Claims. (Cl. 250—43.5)

This invention relates to an improved infra-red spectrograph and more particularly to a device adapted to be combined with an ordinary infra-red spectrograph for the purpose of simplifying its operation and obtaining more usable records.

It is well known that molecules, except for diatomic elements, absorb radiation in the infra-red. By infra-red in the present usage, I mean radiation of wavelength longer than that of the visible spectra, or from about 10,000 A. U. ($1\mu$) and longer. The absorption of molecules in the infra-red is specifically and characteristically different for different materials.

With organic molecules, for example, it is known that between about 1300 cm.$^{-1}$($7.7\mu$) and 600 cm.$^{-1}$($16.6\mu$) a variety of absorptions will appear in the infra-red, which are characteristic of specific molecules. In addition, it is known that certain groups or bonds in various organic molecules usually produce specific absorptions in a very characteristic manner. For example, the frequency associated with the molecular vibration of a $CH_3$ group is found to lie very close to 1375 cm.$^{-1}$($7.29\mu$). This is almost invariably the case in molecules containing this grouping. Likewise, molecules containing double bonds are found usually to absorb between 1600 cm.$^{-1}$($6.25\mu$) and 1800 cm.$^{-1}$($5.55\mu$). Triple bonds are found to absorb between 1800 cm.$^{-1}$($5.55\mu$) and 2500 cm.$^{-1}$($4\mu$). There are numerous additional characteristic effects, such as those cited above, for various molecular groupings, and these effects are well known in the art.

One value of an instrument for measuring and recording infra-red radiation is to determine the characteristic absorption frequencies for unknown organic compounds, and from the position of these frequencies, and with information which has been catalogued such as illustrated above, to partially characterize the nature of the molecule. It is of great advantage to an organic chemist to know, for example, that a compound which he is to examine contains certain specific groups; bonds; certain substitution positions, etc.

A second very valuable usage of infra-red spectrographic equipment follows from the first. Since practically all organic molecules produce different absorption effects in the infra-red, it is possible, by measuring the strength of their absorption maxima, to determine quantitatively how much of a specific chemical compound is present in a sample. This procedure has great advantages over ordinary chemical procedure in that it is frequently possible to analyze a specific material in the presence of unknown materials, and without standards except, of course, for the material of interest. Likewise, in known systems, analyses are simplified in that the technique of an infra-red analyses is always the same, while an organic quantitative analyses for a given constituent in a known system will involve a search for suitable chemical reactions to separate the materials. Such infra-red analyses can be used with gases, liquids, solutions, and solids, and so can be applied to a very wide range of problems.

The present invention is intended to assist in obtaining the infra-red spectrogram record on the basis of absolute transmission. That is, the infra-red data is recorded as a curve which varies over a given fixed range on a recorder. One limit of this range may represent zero and the other limit 100% transmission (or the scale may be used in suitable density units varying from infinite density to zero density). It has many advantages over prior art devices including giving a more accurate description of the infra-red radiation to be analyzed and eliminating numerous exacting adjustments which must be frequently made in existing equipment.

It is an object of the present invention to provide an improved process and apparatus for analyzing compounds by means of infra-red spectra.

It is a further object of the present invention to provide an improved infra-red spectrograph apparatus which does not require frequent exacting adjustment.

It is a further object of the present invention to provide an improved infra-red spectrograph apparatus which yields data varying in a fixed range on a recorder.

These and other objects are attained by this invention wherein there is provided an infra-red spectrograph apparatus and process whereby there is provided means for alternately passing the entire radiation beam down two different paths and the recombining into one path. The apparatus is preferably an accessory to an ordinary infra-red spectrograph but in combination may be considered a complete improved spectrograph.

Generally the accessory has a revolving half mirror for alternatively splitting the beam of light from the light source, one-half of the time the beam is passed through one cell which may, for example, contain a solvent, and the other half of the time the beam passes through another cell which may, for example, contain the same solvent and an unknown compound. In the path of one beam is a moveable comb operated by a selsyn motor synchronized with the intensity of the beam on the bolometer of the spectrograph so as to make both beams of the same intensity. Recording of the movement of the comb is thus used to indicate absorption rather than the bolometer recording.

The construction and operation of the apparatus will be more clearly understood by reference to the attached drawings but it will be understood that they illustrate a preferred embodiment and that the invention is not so limited. In the drawings:

Fig. 3 is a perspective view of the spectrograph accessory,

Fig. 4 is a detailed perspective view of the revolving mirror,

Fig. 5 is a detail perspective partly in section of the comb device,

Fig. 8 is a schematic view of the electrical circuit for operation of the apparatus, and, Fig. 9 is a schematic view of a modification of the device of Fig. 1.

Figure 1:
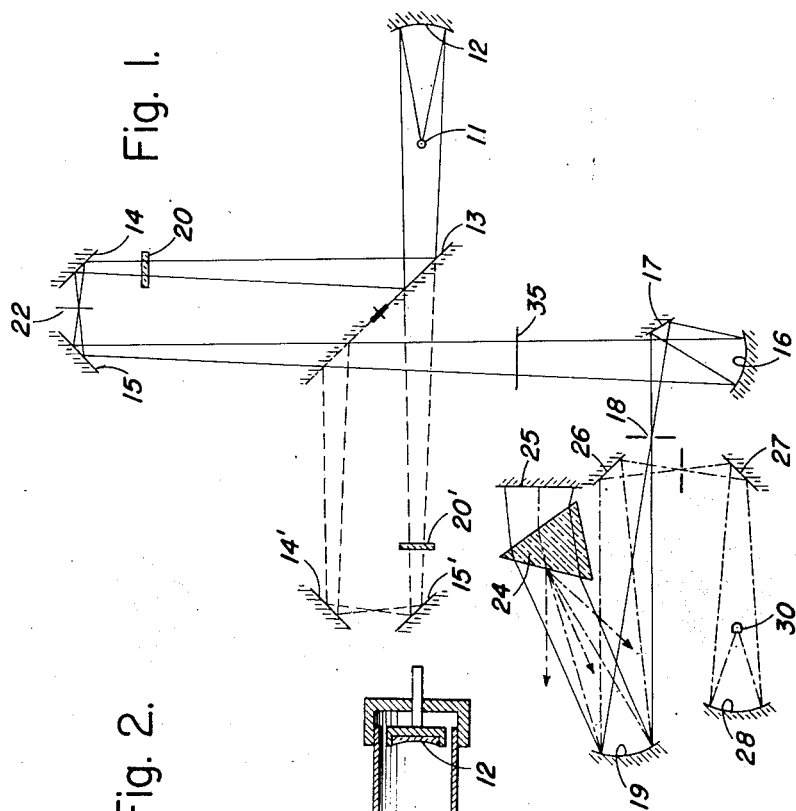
Fig. 1 is a schematic view of the light paths in the apparatus.
Figure 2:
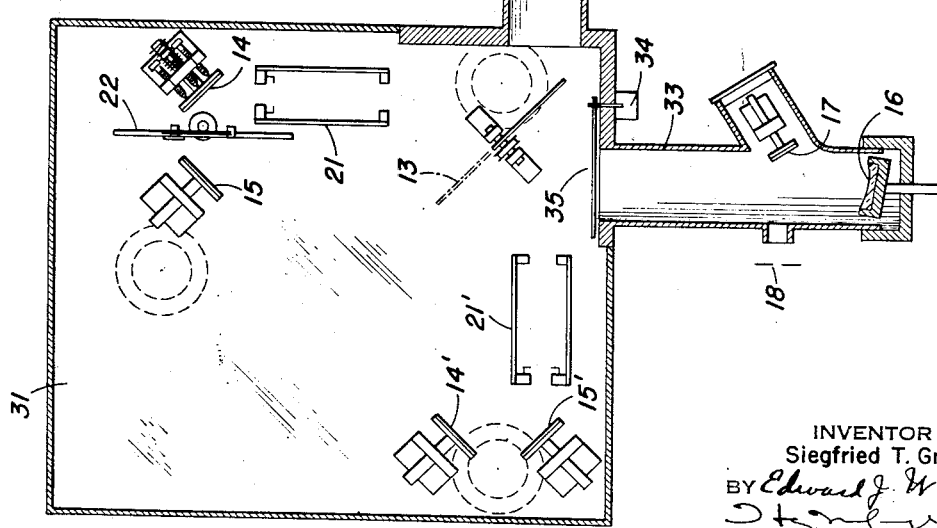
Fig. 2 is a sectional view taken from the top of the spectograph accessory.

Referring to Figures 1 and 2 there is shown the light source 11 which is an incandescent wire. The radiation from this source is collected by the parabolic mirror 12, which produces a beam of radiation which is intermittently interrupted by the rotating double surface half disc mirror 13. The radiant beam at this point follows one of two symmetrical and identical paths. When the equipment is operating it follows these two paths alternately. Each beam leads to two flat mirrors 14, 15, or 14' or 15' passing through sample cells 20, 20' in cell holders 21, 21'. Between mirrors 14 and 15 is a moveable comb 22. The beam leaving mirror 15 or 15' passes back to the rotating mirror and is either transmitted or reflected (beam 15 is transmitted, beam 15' is reflected to pass to the parabolic mirror 16, from which it is reflected to the deflection mirror 17 to pass to the slit 18 of spectrograph).

The diagram in Figure 1 indicating the spectrograph is purely conventional. Radiation passing through the slit 18, focussed by the parabolic mirror 19 to pass through prism 24, reflected from plan mirror 25, to repass through the prism, the refracted radiation is collected again by parabolic mirror 19 focussed so that a specific wavelength will be reflected by plane mirrors 26 and 27; the divergent beam obtained being collected by parabolic mirror 28 and focussed on a thermocouple, bolometer 30, or other suitable detector of intra-red radiation. Movement of the plane mirror 25 will fix the exact wavelength which is focussed to reach the thermosensitive element.

If the rotating mirror 13 of the accessory instrument is operating and if no samples are placed in the system, radiation of any given wavelength selected falls continuously on the thermosensitive element. However, if an absorbing specimen is placed in one of the two paths followed alternately by the radiation, and if, further, the wavelength of the spectrograph is adjusted to some wavelength which is partly absorbed by the sample, the alternating beams on reaching the thermosensitive element have different intensities and produce a pulsating signal. This signal can be amplified electronically and rectified. The rectified output is fed into a recorder which is mechanically coupled with a comb device in the reference beam of the slit beam accessory. Thus, if an absorption occurs at a given wavelength, the recorder moves in the direction indicating this absorption and simultaneously intersperses the comb to a greater and greater degree in the reference beam. When the comb cuts off such a percentage of the reference beam that no A. C. signal is produced, the recorder motion stops. Thus, if the wavelength of the spectrograph is slowly changed, the recorder through the use of this null principle gives a faithful reproduction of the absorption properties of the sample as a function of wavelength. The type of reproduction is fixed by the shape of the comb tooth members which are interspersed into the standard beam of the accessory instrument.

It is, of course, possible to place a solution of the sample to be examined in one beam of the accessory and a similar amount of the pure solvent used in the reference beam. Under these conditions, the record is the absorption spectra of the dissolved sample, and the effect of the solvent is cancelled out. Likewise, it is possible to take a sample of a known material which is impure for the first beam and place a sample of the known material which is known to be pure in the reference beam. In this case, the spectra of the impurity is obtained.

The construction of the equipment is shown in Figure 2. The radiation source 11 is a glowing wire or other electrically-heated element. The rotating half disc mirror 13 is front surfaced on each side with aluminum, rhodium, silver or other suitable reflecting films. All plane mirrors are front surfaced in a similar manner. All parts are mounted in a heavy metal box 31 or the like. A light source tube 32 and a light transmission tube 33 are provided to contain the radiation source 11 and the transmission mirrors 16 and 17 respectively. A selsyn motor 34 is also provided to operate a shutter 35 to keep the light intensity within desired limits.

With reference to Fig. 3, there is shown a perspective view of the exterior of the whole spectrograph accessory. The box 31 is mounted upon legs 38, which may be provided with adjustable screws 39 for levelling the device. On the top of the box is a motor 40 for driving the revolving mirror and removable covers 41—41 cover the cell holders. Tubes 32 and 33 are seen in this view as well as selsyn motor 34.

In Fig. 4 there is shown a perspective view of the revolving mirror 13. The mirror is secured to the base of box 31 by means of standards 43—43. Between the standards is an axle 44 passing through an extension in the half mirror which may be integrally attached to a pulley 45 or alternatively to a gear device, not shown, to which the power for rotation is applied from motor 40 mounted above the mirror device. It is important that the mirror be sturdily mounted preferably in bearings so that its rotation is smooth. The mirror may be constructed of glass with a reflecting metal on the outer surface thereof.

In Fig. 5 there is shown a perspective view partly in section of the comb device 22. A rail 48 to which the comb 22 is rigidly attached is adapted to be driven longitudinally by a selsyn motor 49 through a gear wheel 50 and gear teeth 51. The comb is mounted on the floor of box 31 by means of standards 52—52 which preferably contains rotary discs or bearings 53—53 for guiding the rail.

Figure 6:
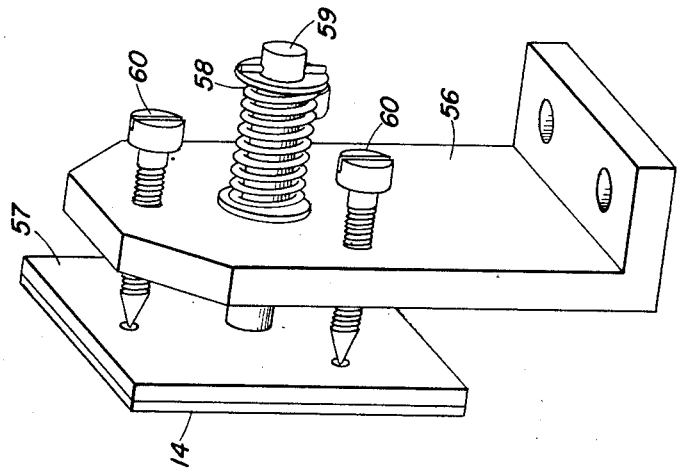
Fig. 6 is a detail perspective of a flat mirror.

Fig. 6 is a perspective view of one of the flat mirrors. A standard 56 is provided for mounting the mirror on the floor of box 31. The mirror, as for example mirror 14, may be adhered or otherwise attached to a base plate 57 which is urged toward the standard 56 by means of spring 58 mounted about rod 59. A plurality of said screws 60, preferably three in number, are mounted in the standard and adapted to be turned therein and contact the base plate 57 for the purpose of changing the angle of the mirror.

Figure 7:
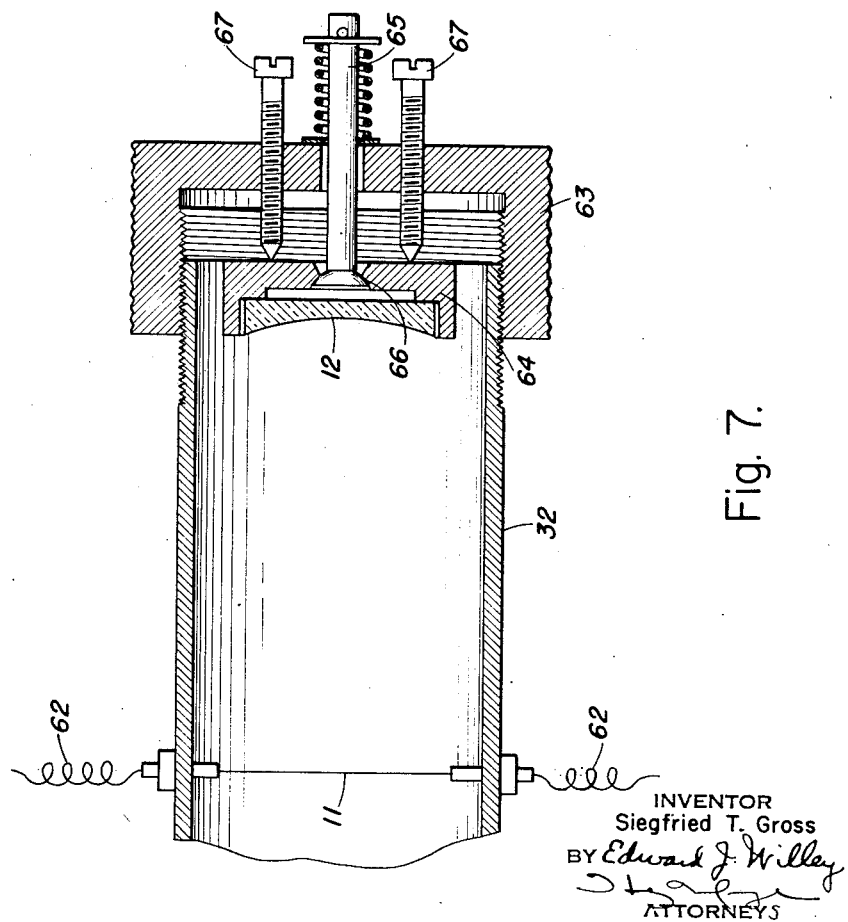
Fig. 7 is a cross sectional detail view of the light source tube.

In Fig. 7 there is shown a cross sectional detailed view of the light source tube 32 containing the incandescent wire 11 passing through the diameter of the tube and connected outside the tube by wires 62—62 to the source of heating current. The tube 32 preferably has screw threads at one end thereof upon which is adapted to be screwed a cap 63. Parabolic mirror 12 is mounted in a bracket 64 which is urged toward the cap by means of a rod 65 having a universal joint 66 connecting the rod with the bracket 64. In the cap are a plurality of set screws 67—67 which may be adjusted to control the angle of the mirror.

While selsyn motors have been illustrated for operating several of the movable parts, it will be understood that they are used for convenience in permitting remote control but that other impulse responsive driving means could be used instead. In Fig. 8 there is shown a diagrammatic electrical circuit for operating the device employing selsyn motors. The accessory unit is indicated as having 3 selsyn motors $S_1$, $S_2$ and $S_3$. These selsyn motors with five leads each are connected with 3 selsyn motors $S_1'$, $S_2'$ and $S_3'$ which serve to control them. $S_3$ and $S_3'$ represent the motors rotating the half mirror. $S_3'$ is in turn driven from a power source which in turn is driven by a 6 cycle motor which receives its power from the 110 volt A. C. line. The 6 cycle motor is also connected to the 2 microswitches on either side of motor $S_3'$. The same 110 volt line may be used to operate a heater power transformer as indicated which in turn is used to operate the light source.

The D. C. signal produced by any constant temperature effect on the bolometer or the A. C. signal caused by the fluctuation of temperature on the bolometer are passed to the breaker amplifier, which is a commercially available device, which amplifies the A. C. signal and which would amplify the D. C. signal except for the feedback device which, by the use of a battery and variable resistances, feeds back approximately the same amount of D. C. current that is introduced by the bolometer thus virtually nullifying D. C. signals from the breaker amplifier yielding an amplified A. C. signal. An A. C. signal is passed to the relay case where it is rectified to put it in phase with the rotation of the mirror to convert it to a D. C. signal. This D. C. signal is filtered and passed to the recorder device where it is amplified and where it controls motor $M_2$ which drives the recorder pen. Motor $M_2$ also operates selsyn motor $S_2'$ which in turn operates the comb device. The breaker amplifier is powered by means of a power pack which is supplied from the 110 volt A. C. line. It will thus be seen that while a positive signal appears the recorder receives an impulse and the pen is displaced. Simultaneously with this displacing, selsyn motor $S_2'$ is rotated causing selsyn $S_2$ to intersperse a comb element into the null beam of the accessory unit. This motion continues until the A. C. signal from the bolometer ceases and balance is achieved. Thus, the pen on the recorder traces an absorption phenomena occurring in the spectrograph.

The feedback device, in addition to substantially nullifying current from the bolometer, also creates an equal impulse which is amplified and sent to motor $M_1$ which drives selsyn $S_1'$ which in turn moves selsyn $S_1$ in such a manner that a shutter obstructs to a greater or less extent the radiation leaving the accessory unit. The operation of the shutter is important since large fluctuations in the bolometer D. C. signal are automatically compensated for, thus increasing the sensitivity of the instrument substantially.

The comb device which is interspersed in the reference beam is illustrated in Fig. 5. In actual application, two combs are used alternatively. One of these combs is cut with linear teeth (direct transmission), the second with teeth cut of such shape that the recorder reads directly in density units (density comb). The comb mechanism is driven by a selsyn-type motor which is controlled by a second selsyn motor fastened to the recorder. The connections between these selsyns are arranged so that throwing a switch will cause the controlled selsyn to operate in the reversed direction and to utilize the second comb. Thus, the operation of this switch will serve to convert the instrument from a direct transmission scale to a density scale or vice versa.

One new feature of this instrument is the positioning of the comb device. In the prior art equipment, the comb used for decreasing radiation intensity is usually placed in divergent or convergent radiation. Because of this, the accuracy for even direct transmission measurements is low. In the present instrument, the comb is interspersed through a focal image of the source. Since the source is very narrow, the comb can accurately delineate the percentage of infra-red radiation which is allowed to pass. With diverging radiation as used in the prior art, the comb must pass through a cone of infra-red radiation, and no simple function of comb shape will permit obtaining accurately either direct transmission or density values.

Another advantage in the proposed invention is the fact that only a single beam of radiation is taken from the heating element, this beam being then alternately passed, in its entirety, through one light path or the other. In operation, of course, the beam passes successively through one path and then the other. In the prior art, it has been customary to take two infra-red beams from the same source, pass them along different paths, and finally, with a rotating mirror or other device, to bring them into the same path. If there are temperature variations in the source, as is almost invariably the case, taking two beams from the same source will not produce beams of identical strength and quality.

Another advantage of the proposed invention replaces a procedure used with prior instruments by a modification which increased the sensitivity and accuracy of the recordings. With prior equipment it is necessary to use a cam action to change slit widths when scanning the spectra. This is required because the radiation from the ordinary infra-red source is not sufficiently intense at the longer wavelengths to produce a measurable signal from the infra-red detector unless wide slits to give as much radiation as possible are utilized. As scanning proceeds toward shorter wavelengths, the intensity distribution of the radiant energy is such that far more radiation than is desirable strikes the heat detecting element. For this reason, and also for the gain in resolution obtained, it is customary to decrease the slit width continuously during the scanning operation. By slit width is meant the slit entrance of the formal infra-red spectrograph (or its equivalent) as indicated in Fig. 1. The present invention yields a very sharp and defined image at the position of the slit of the spectrograph, rendering the use of the ordinary slit unnecessary. In other words, the lower wavelength radiations which do not exist in suitable intensity with narrow slits under ordinary operation, in the new method are present in a concentrated slit image at the spectrograph so that the higher resolution may be used over all wavelength ranges. As a means for decreasing the intensity of radiation at the shorter wavelength, it is proposed that a second comb or shutter device be incorporated in the instrument prior to the spectographs slit, which is to be controlled in the following manner:

The signal from the thermosensitive element after amplification results in an output which can be considered as a mixture or synthesis of an A. C. signal and a D. C. signal. The A. C. signal is taken off to operate the null comb device as described earlier in the patent. The D. C. component represents the average temperature of a thermocouple, and it is this temperature which should be kept constant. Therefore, it is proposed that this D. C. signal be fed into a bridge arrangement with an auxiliary amplifier such that the second intercepting comb will decrease the strength of the signal falling on the thermopile to an amount fixed by the adjustment of the resistance bridge mentioned above.

This method of adjusting the strength of the beam results in several distinct and valuable advantages over the methods known in the prior art. First, the adjustment is continuous and is always accurate in maintaining the temperature of the thermosensitive element at the desired point, while with the slit adjustments of the prior methods, the cams used must necessarily be imperfect since the operation of the instrument changes from day to day and results in a less reproducible behavior. Second, an extremely important advantage of the new method is the following:

If a sample is being analyzed in solution in a suitable solvent, and the reference cell has been filled with the pure solvent, it is found that when the instrument scans a wavelength in which the solvent has an absorption, there is not enough energy in the two radiant beams to fix the position of the null comb and, consequently, the instrument will drift, giving records which are extremely inaccurate in the immediate vicinity of this strong absorption. This fault of the method is well known. With the intercepting comb as proposed, especially in the high energy region, if such strong solvent absorptions were to appear in both beams, the comb would be deflected to increase the total energy falling on the thermosensitive element and when sufficient energy is available, will be able to overcome the absorption effects of the solvent to give an accurate and reproducible absorption spectra of the solute.

In actual operation, it is advantageous to arrange two slits, one in each of the two light paths near the focal position for optical trimming. The use of these two slits is to balance empty cells against each other so that the factors such as variations in polishing, etc., will be compensated and will not produce artifacts on the final density or transmission curve.

While the device illustrated in Figures 1 to 8 is the preferred form of the invention variations are possible within the scope of the invention. For example, at Figure 9 there is shown schematically a modification wherein an infra red light beam from source 70 passes through an interference cell 71 is reflected on mirror 72 to revolving half disc mirror 73 and then through sample cell 74 to a radiation detector 75. On the next half rotation of mirror 73 the beam from cell 71 strikes mirror 73 and is deflected on mirror 76 through cell 77 which may contain a pure standard. This device may be used in plant processes to detect impurities for example.

Some of the new features of the present invention are the following: A single beam of infrared energy is used in its entirety, successively passing through the two separate paths required for compensating operation; a selsyn-controlled motor for operating the comb intercepting device in one of the two paths mentioned; the use of a selsyn-controlled shutter device to adjust the strength of the combined beams so that the intensity of radiation falling in the thermocouple will be kept at a fixed level regardless of the fluctuations brought about by the materials being analyzed; use of a means for separating the D. C. and A. C. component of the amplified signal such that the A. C. component may be used in the ordinary manner to operate the recorder and compensated comb and that the D. C. signal be balanced in a bridge arrangement to keep the combined intensity of the two beams falling on the infra-red detector at a constant level.

While the device has been described as an infra-red spectrophotometer other types of radiation may be used.

What I claim is:

1. An infra-red spectrographic device comprising a source of directed infra-red radiation, a rotary half disc mirror silvered on both sides for alternately and continuously passing the entire beam down two different paths, radiation absorbing material in at least one path, means for combining the two paths into one path and radiation detecting means in said one path.

2. An infra-red spectrographic device comprising a source of directed infra-red radiation, a rotary half disc mirror silvered on both sides for alternately and continuously passing the entire beam down two different paths, radiation absorbing material in at least one path, a selsyn controlled comb operating in one of said two paths through a focal image of said source to keep the intensity of the two beams equal, means for combining the two paths into one path and radiation detecting means in said one path.

3. A spectrograph device comprising a source of directed infra-red radiation, means for alternately and continuously passing the entire beam down two different paths, radiation absorbing material in at least one path, a selsyn controlled comb operating in one of said two different paths, means for combining the two paths into one path, a selsyn controlled shutter means to adjust the total combined beam strength to a predetermined value, radiation detecting means in said one path and a recorder for recording comb movement.

4. A spectrograph device comprising a source of directed infra-red radiation, means for alternately and continuously passing the entire beam down two different paths, radiation absorbing material in at least one path, a selsyn controlled comb operating in one of said two different paths, means for combining the two paths into one path, a selsyn controlled shutter means to adjust the total combined beam strength to a predetermined value, radiation detecting means in said one path, a recorder for recording comb movement, means for separating the D. C. and A. C. component of the amplified signal from the said detecting means, means to operate the recorder and comb with the A. C. signal, and a bridge device to balance the D. C. signal.

5. An infra-red spectrograph analytical device comprising a source of directed infra-red radiation, a rotary half disc mirror silvered on both sides adapted to alternately and continuously pass the entire beam of radiation down two different paths, a cell in each of said paths adapted to contain material whose radiation absorption is being tested and a material of different absorbency respectively, a selsyn controlled comb operating in one of said two paths in a focal image of said infra-red source to keep the intensity of the two beams equal, a recorder for recording the comb movement, a means for combining the two paths into one path, a selsyn controlled shutter device adapted to adjust the total combined beam strength to a predetermined level, a monochromator containing a radiation detector and adapted to detect the radiation in a plurality of wavelengths successively, and means for separating the D. C. and A. C. component of the amplified signal from said detector such that the A. C. component operates the recorder and comb, and a bridge arrangement balancing the D. C. signal and operating the shutter.

6. An infra-red spectrograph analytical device comprising a source of directed infra-red radiation, a rotary half disc mirror silvered on both sides adapted, alternately and continuously, to pass the entire beam of radiation down two different paths, a cell in each of said paths adapted to contain material whose radiation absorption is being tested and a material of different absorbency respectively, a selsyn controlled comb operating on one of said two paths in a focal image of said infra-red source to keep the intensity of the two beams equal, a recorder for recording the comb movement, a means for combining the two paths into one path, a selsyn controlled shutter device adapted to adjust the total combined beam strength to a predetermined level, a rotating prism adapted to pass beams of successive wavelengths, a monochromator containing a radiation detector and adapted to detect the radiation in a plurality of wavelengths successively, and means for separating the D. C. and A. C. component of the amplified signal from said detector such that the A. C. component operates the recorder and comb, and a bridge arrangement balancing the D. C. signal and operating the shutter.

References Cited in the file of this patent

UNITED STATES PATENTS

| Number | Name | Date |
| --- | --- | --- |
| 1,727,173 | Muller | Sept. 3, 1929 |
| 1,806,199 | Hardy et al. | May 19, 1931 |
| 1,999,023 | Sharp et al. | Apr. 23, 1935 |
| 2,222,429 | Briebrecher | Nov. 19, 1940 |
| 2,314,800 | Pineo | Mar. 23, 1943 |
| 2,376,311 | Hood | May 15, 1945 |
| 2,451,572 | Moore | Oct. 19, 1948 |
| 2,458,973 | Barnes | Jan. 11, 1949 |
| 2,469,206 | Rich | May 3, 1949 |
| 2,474,098 | Dimmick | June 21, 1949 |
| 2,499,322 | Mather et al. | Feb. 28, 1950 |
| 2,547,212 | Jamison et al. | Apr. 3, 1951 |

OTHER REFERENCES

An Automatic Recording Infra-Red Spectrophotometer, by W. S. Baird et al., Journal of the Optical Society of America, Oct. 1947, pp. 754–751.